United States Patent
Lu et al.

(10) Patent No.: US 9,847,527 B2
(45) Date of Patent: Dec. 19, 2017

(54) NON-METAL ANODE ALKALI AND ALKALINE-EARTH ION BATTERIES WITH HEXACYANOMETALLATE CATHODE

(71) Applicant: Sharp Laboratories of America, Inc., Camas, WA (US)

(72) Inventors: Yuhao Lu, Vancouver, WA (US); Jong-Jan Lee, Camas, WA (US); Motoaki Nishijima, Kanmaki-tyo (JP); Seizoh Kakimoto, Nara (JP)

(73) Assignee: Sharp Laboratories of America, Inc., Camas, WA (US)

( * ) Notice: Subject to any disclaimer, the term of this patent is extended or adjusted under 35 U.S.C. 154(b) by 152 days.

(21) Appl. No.: 14/699,918

(22) Filed: Apr. 29, 2015

(65) Prior Publication Data
US 2015/0243987 A1    Aug. 27, 2015

Related U.S. Application Data (60) Division of application No. 13/449,195, filed on Apr. 17, 2012, now Pat. No. 9,559,358, which is a (Continued)

(51) Int. Cl.
*H01M 4/1399* (2010.01)
*H01M 4/58* (2010.01)
(Continued)

(52) U.S. Cl.
CPC ........... *H01M 4/58* (2013.01); *H01M 4/0404* (2013.01); *H01M 4/0438* (2013.01);
(Continued)

(58) Field of Classification Search
CPC ......... H01M 2004/028; H01M 4/1399; H01M 4/663
(Continued)

(56) References Cited

U.S. PATENT DOCUMENTS

2005/0100788 A1* 5/2005 Sada .................. H01M 4/0416
429/217
2012/0328936 A1 12/2012 Wessells et al.
(Continued)

FOREIGN PATENT DOCUMENTS

EP          0131392        1/1985
JP          09/129217      11/1995
(Continued)

OTHER PUBLICATIONS

U.S. Appl. No. 14/731,607, filed Jun. 5, 2015, Song et al.
(Continued)

*Primary Examiner* — Zulmariam Mendez
(74) *Attorney, Agent, or Firm* — Law Office of Gerald Maliszewski; Gerald Maliszewski (57) ABSTRACT

A battery structure is provided for making alkali ion and alkaline-earth ion batteries. The battery has a hexacyanometallate cathode, a non-metal anode, and non-aqueous electrolyte. A method is provided for forming the hexacyanometallate battery cathode and non-metal battery anode prior to the battery assembly. The cathode includes hexacyanometallate particles overlying a current collector. The hexacyanometallate particles have the chemical formula $A'_n A_m M1_x M2_y (CN)_6$, and have a Prussian Blue hexacyanometallate crystal structure.

8 Claims, 6 Drawing Sheets

Related U.S. Application Data continuation-in-part of application No. 13/432,993, filed on Mar. 28, 2012, now Pat. No. 9,269,953.

(51) Int. Cl.
| | |
|---|---|
| *H01M 4/04* | (2006.01) |
| *H01M 4/139* | (2010.01) |
| *H01M 10/054* | (2010.01) |
| *H01M 10/36* | (2010.01) |
| *H01M 4/136* | (2010.01) |
| *H01M 4/587* | (2010.01) |
| *H01M 4/02* | (2006.01) |

(52) U.S. Cl.
CPC ....... *H01M 4/0445* (2013.01); *H01M 4/0459* (2013.01); *H01M 4/136* (2013.01); *H01M 4/139* (2013.01); *H01M 4/587* (2013.01); *H01M 10/054* (2013.01); *H01M 10/36* (2013.01); *H01M 2004/028* (2013.01); *Y02E 60/122* (2013.01)

(58) Field of Classification Search
USPC .......................................................... 205/50
See application file for complete search history.

(56) References Cited

U.S. PATENT DOCUMENTS

| | | |
|---|---|---|
| 2013/0052538 A1 | 2/2013 | Pasta et al. |
| 2013/0284988 A1 | 10/2013 | Satake et al. |

FOREIGN PATENT DOCUMENTS

| | | |
|---|---|---|
| JP | 09/147916 | 11/1995 |
| JP | 2001-102086 | 4/2001 |
| JP | 2007/299698 | 11/2007 |
| JP | 2011/246303 | 5/2010 |
| JP | 2012046399 | 3/2012 |
| JP | 2012/074189 | 4/2012 |
| JP | 2013/254682 | 6/2012 |
| JP | 2013-214510 | 3/2013 |

OTHER PUBLICATIONS

U.S. Appl. No. 14/731,165, filed Jun. 4, 2015, Song et al.
Long Wang et al., "A Superior Low-Cost Cathode for a Na-ion Battery", Angewandte Chemie Intrnational Edition, vol. 52, No. 7. (2013).

* cited by examiner

NON-METAL ANODE ALKALI AND ALKALINE-EARTH ION BATTERIES WITH HEXACYANOMETALLATE CATHODE

RELATED APPLICATIONS

This application is a Divisional of a pending application entitled, ALKALI AND ALKALINE-EARTH ION BATTERIES WITH HEXACYANOMETALLATE CATHODE AND NON-METAL ANODE, invented by Yuhao Lu et al., Ser. No. 13/449,195, filed Apr. 17, 2012, which is incorporated herein by reference;

which is a Continuation-in-Part of a pending application entitled, ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012, which is incorporated herein by reference.

BACKGROUND OF THE INVENTION

1. Field of the Invention

This invention generally relates to electrochemical cells and, more particularly, to an alkali or alkaline-earth ion battery made from a hexacyanometallate cathode and non-metal anode.

2. Description of the Related Art

A battery is an electrochemical cell through which chemical energy and electric energy can be converted back and forth. The energy density of a battery is determined by its voltage and charge capacity. Lithium has the most negative potential of −3.04 V vs. $H_2/H^+$, and has the highest gravimetric capacity of 3860 milli-amp-hours per gram (mAh/g). Due to their high energy densities, lithium-ion batteries have led the portable electronics revolution. However, the high cost of lithium metal renders doubtful the commercialization of lithium batteries as large scale energy storage devices. Further, the demand for lithium and its reserve as a mineral have raised the need to build other types metal-ion batteries as an alternative.

Lithium-ion (Li-ion) batteries employ lithium storage compounds as the positive (cathode) and negative (anode) electrode materials. As a battery is cycled, lithium ions ($Li^+$) exchange between the positive and negative electrodes. Li-ion batteries have been referred to as rocking chair batteries because the lithium ions "rock" back and forth between the positive and negative electrodes as the cells are charged and discharged. The positive electrode (cathode) materials is typically a metal oxide with a layered structure, such as lithium cobalt oxide ($LiCoO_2$), or a material having a tunneled structure, such as lithium manganese oxide ($LiMn_2O_4$), on an aluminum current collector. The negative electrode (anode) material is typically a graphitic carbon, also a layered material, on a copper current collector. In the charge-discharge process, lithium ions are inserted into, or extracted from interstitial spaces of the active materials.

Similar to the lithium-ion batteries, metal-ion batteries use the metal-ion host compounds as their electrode materials in which metal-ions can move easily and reversibly. As for a $Li^+$-ion, it has one of the smallest radii of all metal ions and is compatible with the interstitial spaces of many materials, such as the layered $LiCoO_2$, olivine-structured $LiFePO_4$, spinel-structured $LiMn_2O_4$, and so on. Other metal ions, such as $Na^+$, $K^+$, $Mg^{2+}$, $Al^{3+}$, $Zn^{2+}$, etc., with large sizes, severely distort Li-based intercalation compounds and ruin their structures in several charge/discharge cycles. Therefore, new materials with large interstitial spaces would have to be used to host such metal-ions in a metal-ion battery.

Figure 1:
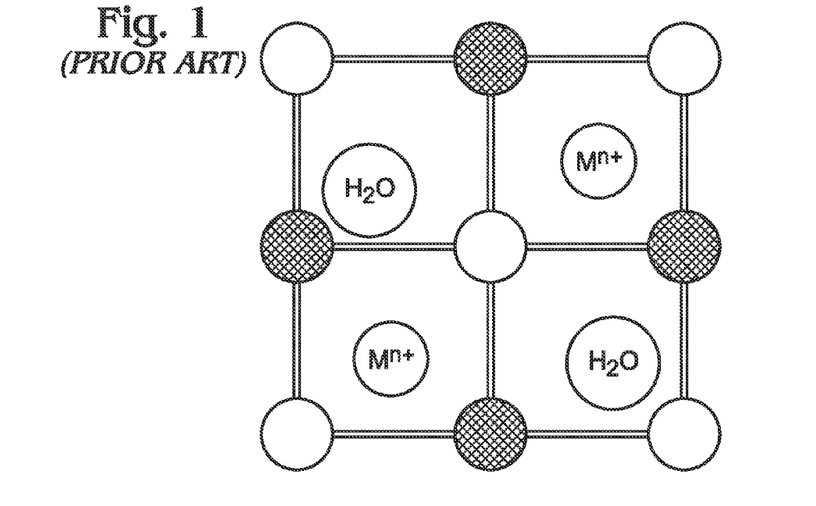
FIG. 1 depicts the framework for an electrode material with large interstitial spaces in a metal-ion battery (prior art).

FIG. 1 depicts the framework for an electrode material with large interstitial spaces in a metal-ion battery (prior art). It is inevitable that the large interstitial spaces in these materials readily absorb water molecules and impure ions, as shown. Water molecules also occupy lattices positions in the electrode material. Although these open spaces are very suitable for the intercalation of metal-ions with large sizes, the water molecules and impure ions degrade the electrochemical performance. In this example, Prussian blue analogues (PBs) with cubic/tetragonal/hexagonal framework have open "zeolytic" lattices that permit $Na^+/K^+$-ions to move easily and reversibly in the framework.

Figure 2:
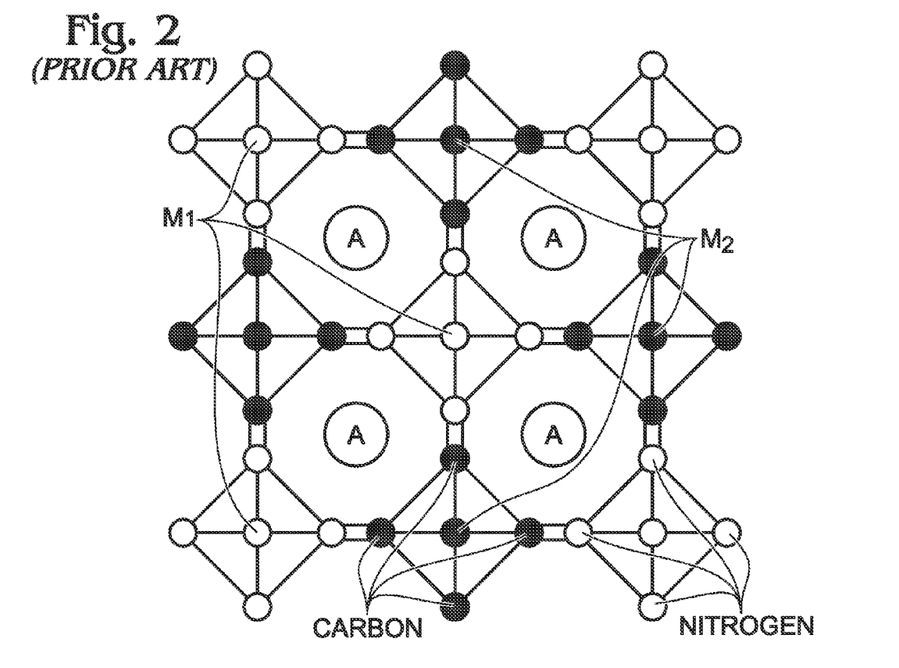
FIG. 2 demonstrates the crystal structure of Prussian blue and its analogues (prior art).

FIG. 2 demonstrates the crystal structure of Prussian blue and its analogues (prior art). Their general molecular formula is $AM1M2(CN)_6 \cdot zH_2O$, in which tetrahedrally coordinated A site is an alkali or alkaline-earth ion, and M1 and M2 are metal ions. The M1 and M2 metals are arranged in a three-dimensional checkerboard pattern, and shown in a two-dimensional pattern. The crystal structure is analogous to that of the $ABX_3$ perovskite. $M_1$ and $M_2$ metal ions are in ordered arrangement on the B sites. The M1 ions are octahedrally coordinated to the nitrogen ends of the $CN^-$ groups, and the M2 ions to their carbon ends. The M1 and M2 ions are connected by the C≡N to form the Prussian blue framework with large interstitial spaces. The large interstitial sites may host the large sized alkali or alkaline-earth ions (A). Water molecules may also occupy lattice positions in the PB analogues. The ion channels connecting the interstitial sites are similar in size to solvated alkali ions such as sodium, potassium, and alkaline-earth ions such as magnesium and calcium allowing rapid transport of these ions throughout the lattice. Therefore, PB is a good choice for an electrode material in sodium/potassium/magnesium/calcium-ion batteries. Nonetheless, thermogravimetric analysis (TG) suggests that every PB molecule contains four to six water molecules. The occupation of water and impure ions in these materials definitely reduces the spaces to host the metal-ions and leads to the reduced capacity of these electrode materials. Therefore, $KCuFe(CN)_6$ has a theoretical capacity of 85.2 mAh/g, but its practical capacity is smaller than 60 mAh/g. In addition, water may react with the intercalated metal-ions and decrease the coulombic and energy efficiencies of the metal-ion batteries. Up to now, no method is reported to remove the water and impure ions from the large interstitial spaces and lattice positions of the hexacyanometallate electrode materials for metal-ions batteries. As a result, most metal-ions batteries with a hexacyanometallate electrode use an aqueous solution as an electrolyte. These batteries have small specific capacities and low voltages.

The open framework structure of the transition metal hexacyanometallates offers faster and reversible intercalation process for alkali and alkaline-earth ions ($A_x$). In a metal-ion battery structure, the metal ions need to be stored in either anode or cathode electrode before assembly. In the case of a Li-ion battery with $LiCoO_2$, $LiFePO_4$, and $LiMn_2O_4$ cathodes, the Li ions are stored in the cathode and the anode is carbon. Therefore, these batteries are assembled in a discharged state. These batteries need to be run through a charge cycle, to move the Li ions to the carbon anode, before they have any power for discharge. In the case of Li—S, Li-air and Na—S batteries, the metal ions are stored in anode. Actually, these anodes are made of Li and Na metals. These batteries are assembled in the charged state— meaning the battery can discharge immediately after assembly. Since alkali (e.g., Li, Na, and K), and other alkaline-earth (e.g., Mg and Ca) metals are very reactive with water vapor and oxygen, the manufacturing cost for such a battery would be prohibitively high, as the manufacturing has to be done in controlled environment.

In the case of sodium-ion batteries and potassium-ion batteries with hexacyanometallates $A_xM_1M_2(CN)_6$ as the cathode materials, it is easy to use a metal anode for the metal-ion battery. For example, a Na-ion battery can be made of a sodium anode and $KFe_2(CN)_6$ cathode, or a K-ion battery with potassium anode and $KFe_2(CN)_6$ cathode. However, these batteries must be assembled in controlled environment ($H_2O$-free, oxygen-free) if a metal anode is used.

It would be advantageous if alkali and alkaline-earth ion batteries could be made with a hexacyanometallate $A_xM_1M_2(CN)_6$ cathode and a non-metal anode.

SUMMARY OF THE INVENTION

Described herein is an alkali-ion battery (e.g., a sodium-ion battery or potassium-ion battery) with a cathode of $A_xM_1M_2(CN)_6$, where the A cations may be Na or K, for example, where x=0-2 and the anode is a non-metal. Also disclosed is an alkaline-earth-ion battery (e.g., a magnesium-ion battery or calcium-ion battery) with a cathode of $A_xM1M2(CN)_6$, where the A cations are Mg or Ca, for example, where x=0-1 and the anode is a non-metal. The non-metal materials for the negative electrode (anode) include carbonaceous materials, oxides, sulfide, and so on.

The battery demonstrates high energy, long cycling life and low cost. Also disclosed is a process of forming an electrode that acts as an ion-source for hexacyanometallates, initially without sodium or potassium ions. A non-aqueous, polymer, or solid electrolyte can be used in the battery. $M_1$ and $M_2$ are the same or different metal ions. Some examples of $M_1$ and $M_2$ are as follows: $M_1$, $M_2$=Ti, V, Cr, Mn, Fe, Co Ni, Cu, Zn, Ca, Mg, etc. The ratio of $M_1$ and $M_2$ can be an arbitrary number. The battery demonstrates a high voltage due to the use of a non-aqueous electrolyte.

Accordingly, a method is provided for forming a hexacyanometallate battery cathode. The method provides dried hexacyanometallate particles having a chemical formula $A'_nM1_xM2_y(CN)_6$ with a Prussian Blue hexacyanometallate crystal structure, including impurities and $H_2O$. A' is an alkali or alkaline-earth cation. M1 is a metal with 2+ or 3+ valance positions. Likewise, M2 is a metal with 2+ or 3+ valance positions. (n) is in the range of 0.5 to 2, x is in the range of 0.5 to 1.5, and y is in the range of 0.5 to 1.5. The hexacyanometallate particles are mixed with a binder and electronic conductor powder in a low boiling point solvent. Drying the mixture forms a $A'_nM1_xM2_y(CN)_6$ paste. A metal current collector is coated with the paste, forming a cathode. After drying the paste, the cathode is soaked in an organic first electrolyte including a salt with alkali or alkaline-earth cations, and a first electric field is created in the first electrolyte between the cathode and a first counter electrode. In response to the first electric field, the method simultaneously removes A' cations, impurities, and water molecules from interstitial spaces and lattice positions in the Prussian Blue hexacyanometallate crystal structure. Hexacyanometallate particles, having a chemical formula of $A'_{n'}M1_xM2_y(CN)_6$, where n'<n, are formed overlying the cathode.

The method then soaks the cathode in an organic second electrolyte including a salt with A cations, where A is an alkali or alkaline-earth cation. In response to creating a second electric field in the second electrolyte between the cathode and a second counter electrode including A elements, A cations are added into the interstitial spaces of the $A'_nM1_xM2_y(CN)_6$ crystal structure. As a result, a cathode is formed with hexacyanometallate particles having the chemical formula $A'_{n'}A_mM1xM2y(CN)_6$, where m is in a range of 0.5 to 2.

Additional details of the above-described method and a battery with a hexacyanometallate cathode and non-metal anode are presented below.

DETAILED DESCRIPTION

Figure 3:
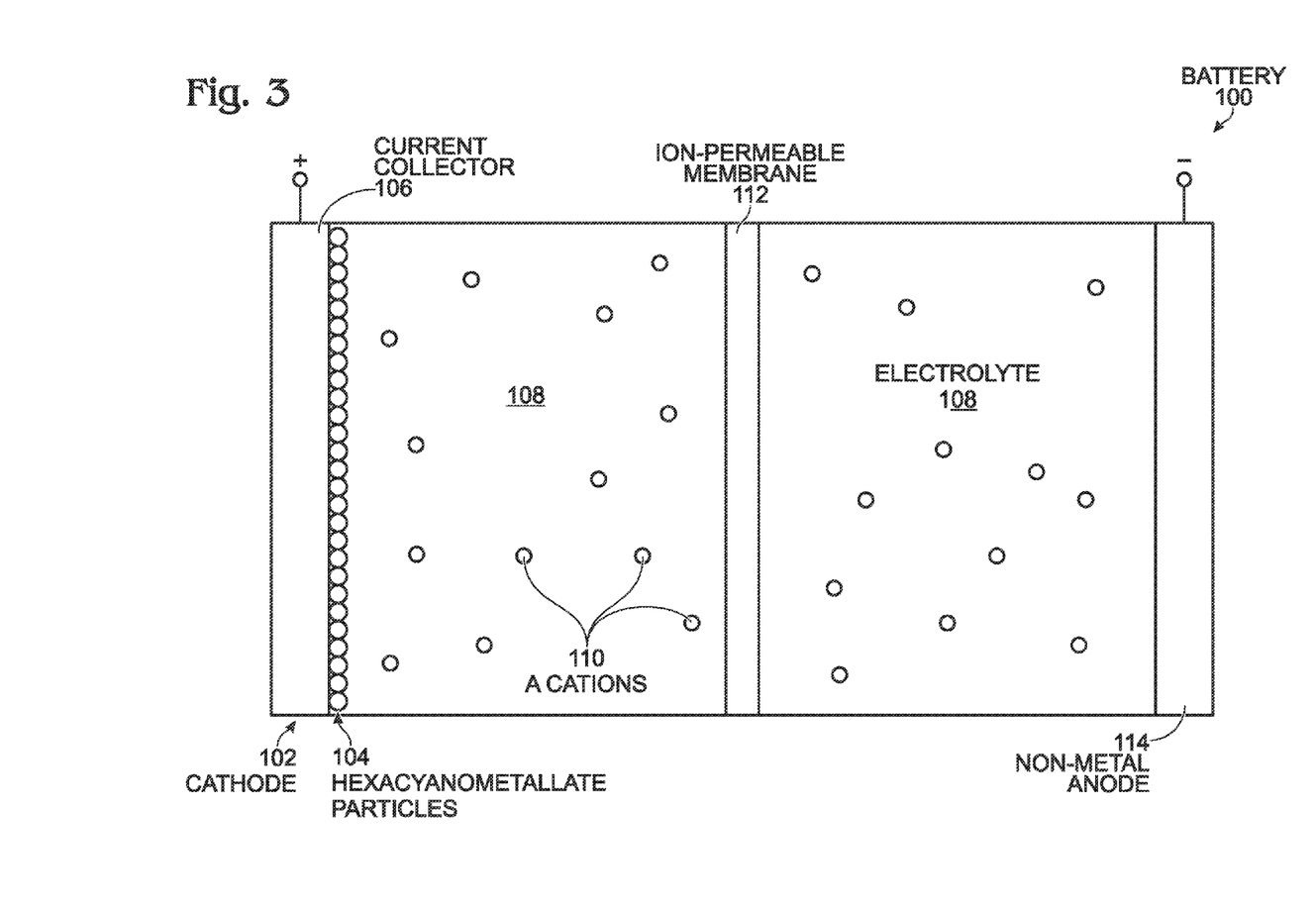
FIG. 3 is a partial cross-sectional view of a battery with a hexacyanometallate cathode and non-metal anode.

FIG. 3 is a partial cross-sectional view of a battery with a hexacyanometallate cathode and non-metal anode. The battery 100 comprises a cathode 102 with hexacyanometallate particles 104 overlying a current collector 106. The hexacyanometallate particles 104 have the chemical formula $A'_nA_mM1_xM2_y(CN)_6$, and have a Prussian Blue hexacyanometallate crystal structure (see FIG. 2). The A cations may be either alkali or alkaline-earth cations. Likewise, the A' cations may be either alkali or alkaline-earth cations. For example, the A and A' cations may be $Na^+$, $K^+$, $Mg^{2+}$, or $Ca^{2+}$. Note: the A and A' cations may be the same or a different material.

M1 is a metal with 2+ or 3+ valance positions. Likewise, M2 is a metal with 2+ or 3+ valance positions. For example, the M1 and M2 metals may be Ti, V, Cr, Mn, Fe, Co, Ni, Cu, Zn, Ca, or Mg. The M1 metal may be the same metal as the M2 metal, or a different metal than the M2 metal.

From the hexacyanometallate formula above, m is in the range of 0.5 to 2, x is in the range of 0.5 to 1.5, y is in the range of 0.5 to 1.5, and n' is in the range of 0 to 2. In one aspect, the cathode hexacyanometallate particles 104 have the chemical formula $A_mM1_xM2_y(CN)_6$, where n'=0.

The battery 100 further comprises an electrolyte 108 capable of conducting A cations 110. An ion-permeable membrane 112 separates a non-metal anode 114 from the cathode 102. Some examples of anode materials include carbonaceous materials, oxides, sulfides, nitrides, silicon, composite material including metal nanoparticles with carbonaceous materials, and silicon nanostructures with carbonaceous materials. The electrolyte 108 may be a non-aqueous, organic, gel, polymer, solid electrolyte, or aqueous electrolyte.

In one example of the battery, the A cations are $Na^+$ cations, the ion permeable membrane 112 is a $Na^+$-ion permeable membrane, and the electrolyte 108 is a $Na^+$ soluble non-aqueous electrolyte. The general expression for the cathode may be: $Na_2M_1M_2(CN)_6$, $NaM_1M_2(CN)_6$, $NaKM_1M_2(CN)_6$, or $M_1M_2(CN)_6$. $M_1$, $M_2$=Ti, V, Cr, Mn, Fe, Co, Ni, Cu, Zn, Ca, Mg, etc. The ratio of $M_1$ and $M_2$ can be an arbitrary number. For example: $Na_2Fe_2(CN)_6$, $NaFe_2(CN)_6$, $NaKFe_2(CN)_6$, and $Fe_2(CN)_6$.

In another example, the A cations are $K^+$ cations, the ion permeable membrane 112 is a $K^+$-ion permeable membrane, and the electrolyte 108 is a $K^+$ soluble non-aqueous electrolyte. The general expression for the cathode materials may be: $K_2M_1M_2(CN)_6$, $KM_1M_2(CN)_6$, $NaKM_1M_2(CN)_6$, or $M_1M_2(CN)_6$. $M_1$, $M_2$=Ti, V, Cr, Mn, Fe, Co, Ni, Cu, Zn, Ca, Mg, etc. The ratio of $M_1$ and $M_2$ can be an arbitrary number. For example: $K_2Fe_2(CN)_6$, $KFe_2(CN)_6$, and $NaKFe_2(CN)_6$.

In another example, the A cations are $Mg^{2+}$ cations, the ion permeable membrane 112 is a $Mg^{2+}$-ion permeable membrane, and the electrolyte 108 is a $Mg^{2+}$ soluble non-aqueous electrolyte. The general expression for the cathode materials may be: $MgM_1M_2(CN)_6$, $Mg_{0.5}M_1M_2(CN)_6$, or $M_1M_2(CN)_6$. $M_1$, $M_2$=Ti, V, Cr, Mn, Fe, Co, Ni, Cu, Zn, Ca, Mg, etc. The ratio of $M_1$ and $M_2$ can be an arbitrary number. For example: $MgFe_2(CN)_6$, $Mg_{0.5}Fe_2(CN)_6$, or $Fe_2(CN)_6$.

If the A cations are $Ca^{2+}$ cations, the ion permeable membrane 112 is a $Ca^{2+}$-ion permeable membrane, and the electrolyte 108 is a $Ca^{2+}$ soluble non-aqueous electrolyte. The general expression for the Ca-ion battery is the same as the Mg-ion battery, just replacing Mg with Ca in the formulas above.

In one aspect, the cathode hexacyanometallate particles 104 have the chemical formula $A'_nM1_xM2_y(CN)_6$, where m=0. The anode 114 includes A cations, and the ion-permeable membrane 112 is permeable to A cations. More explicitly, the ion-permeable membrane 112 is permeable to the A cations used in the anode 114. As used herein, an anode is defined as being a non-metal anode if it is a composite material that includes a metal.

Thus, sodium-ion, potassium-ion, magnesium-ion, and calcium-ion batteries are disclosed with positive (cathode) electrodes of $A_xM_1M_2(CN)_6$, negative (anode) electrodes of a non-metal material, an ion-permeable membrane separating the cathode and anode, and an electrolyte. The material, $A_xM_1M_2(CN)_6$, demonstrates a framework that consists of a $M_1$-N—C-$M_2$ skeleton and large interstitial space as shown in FIG. 2. $M_1$ and $M_2$ are the same or different metal ions ($M_1$, $M_2$=Ti, V, Cr, Mn, Fe, Co, Ni, Cu, Zn, Ca, Mg, etc.) and their ratio can be an arbitrary number. A-ions (Na, K, Mg and Ca) can easily and reversibly move in the interstitial space. The anode is a non-metal material. It can be one of carbonaceous materials, oxides, sulfides or nitrides. In order to obtain a high voltage for the battery, a non-aqueous electrolyte, such as organic electrolyte, gel electrolyte, polymer electrolyte, solid electrolyte, etc., may be used in the battery.

Figure 4:
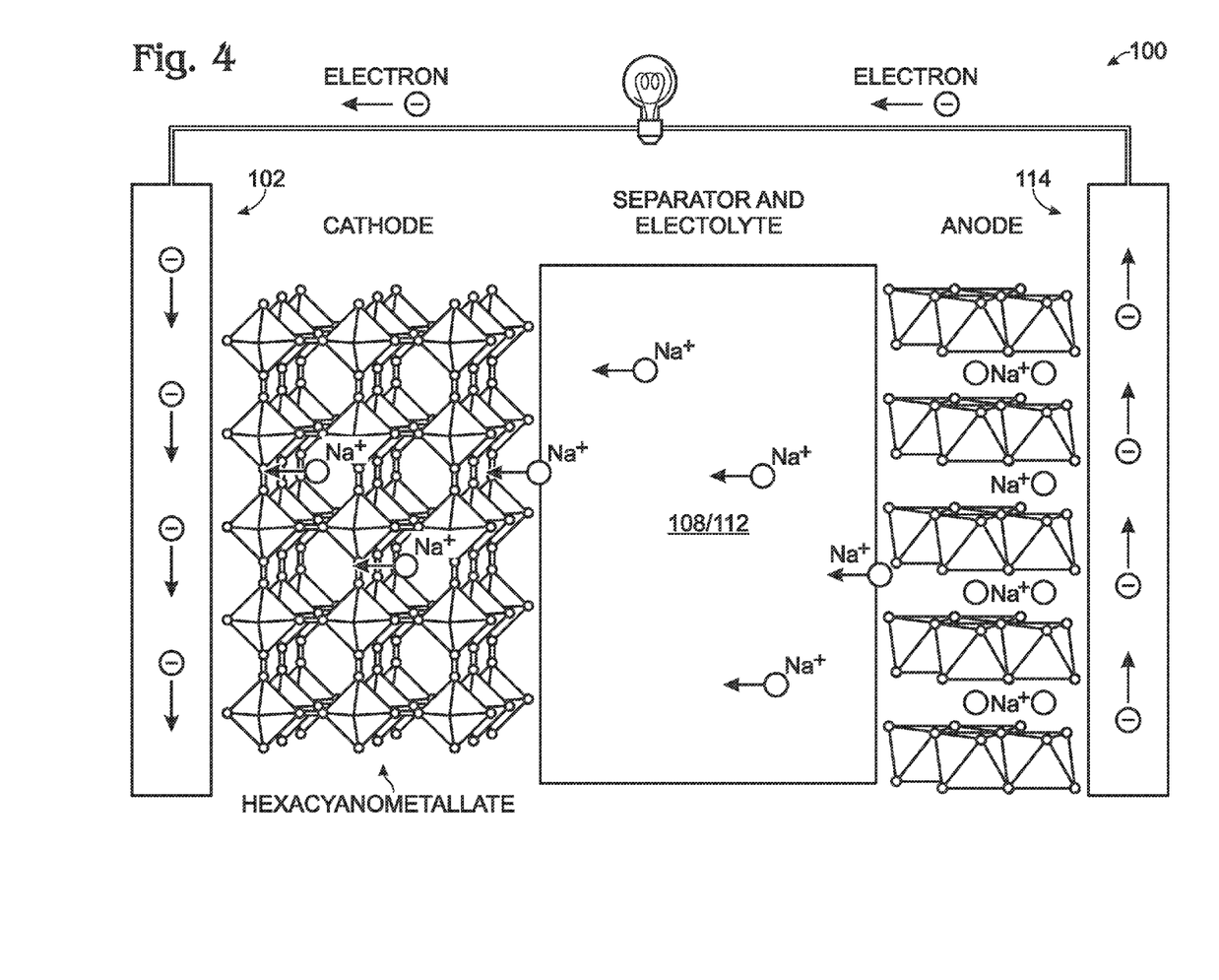
FIG. 4 is a partial cross-sectional schematic view of a Na-ion battery in the discharge state, with a $Na_xM_1M_2(CN)_6$ positive electrode and a non-metal negative electrode separated by a $Na^+$-ion permeable membrane.

FIG. 4 is a partial cross-sectional schematic view of a Na-ion battery in the discharge state, with a $Na_xM_1M_2(CN)_6$ positive electrode 102 and a non-metal negative electrode 114 separated by a $Na^+$-ion permeable membrane 112. In order to obtain a high voltage, a $Na^+$ soluble non-aqueous solution 108, polymer, or solid electrolyte is used in the Na-ion battery. The non-metal negative electrode 114 is the carbonaceous material, oxide, sulfide, and so on. In the charge/discharge process, $Na^+$ ions "rock" back and forth between the positive electrode 102 and negative electrode 114. Similarly, a K-ion battery would have of $K_xM_1M_2(CN)_6$ positive electrode, a non-metal negative electrode, and a $K^+$-ion permeable membrane separating the cathode and anode electrodes. The battery charge reactions at the cathode and anode are shown below.

For sodium-ion battery, the positive electrode:
$Na_xM_1M_2(CN)_6 \rightarrow xNa^+ + M_1M_2(CN)_6 + xe^-$; and,
the negative electrode:
$Na^+ + e^- + \rightarrow (Na)$; =non-metal negative electrode material.
For potassium-ion battery, the positive electrode:
$K_xM_1M_2(CN)_6 \rightarrow xK^+ + M_1M_2(CN)_6 + xe^-$; and,
the negative electrode:
$K^+ + e^- + \rightarrow (K)$; =non-metal negative electrode material.
For magnesium-ion battery, the positive electrode:
$Mg_xM_1M_2(CN)_6 \rightarrow xMg^{2+} + M_1M_2(CN)_6 + 2xe^-$; and,
the negative electrode:
$Mg^{2+} + 2e^- + \rightarrow (Mg)$; =non-metal negative electrode material.
For calcium-ion battery, the positive electrode:
$Ca_xM_1M_2(CN)_6 \rightarrow xCa^{2+} + M_1M_2(CN)_6 + 2xe^-$; and,
the negative electrode:
$Ca^{2+} + 2e^- + \rightarrow (Ca)$; =non-metal negative electrode material.

In the discharge process, all reactions take place in the reverse direction.

The positive electrode fabrication process flow is as follows. Dried $A'_nM_1M_2(CN)_6$ (A'=Na, K, Mg, or Ca) powder with a particle size of 5 nm-1 µm is mixed with binder, such as polytetrafluoroethylene (PTFE), polyvinylidene fluoride (PVDF), etc., and an electronic conductor powder, in a low boiling point solvent to form a paste. The electronic conductor powder may be carbon black, carbon nanotube, carbon nanowire, grapheme, etc., with particle size of 5 nm-10 µm. The $A'_nM_1M_2(CN)_6$ (A'=Na, K, Mg, or Ca) powder contains crystal water even after the drying process. The water is not shown in the formula. The composition of the paste is 60 wt. %-95 wt. % $A'_nM_1M_2(CN)_6$, 0 wt. %-30 wt. % electronic conductor powder, and 1 wt. %-15 wt. % binder. The paste is coated on a metal foil or mesh (Al, Ti, etc.) that is used as the current collector for the positive electrode. After drying, the electrode undergoes forming process. The forming process includes two steps: the first step is to remove the ions ($A'_n$) and residual water from the $A'_nM_1M_2(CN)_6$ lattice. The second step is to fill Na-ions, K-ions, Mg-ions, or Ca-ions into the $A'_nM_1M_2(CN)_6$ lattice. The Na ions and K ions (Mg ions and Ca ions) occupy the A site and these ions are moved in/out of the $A'_nA_mM_1M_2(CN)_6$ lattice during the discharge/charge cycles. Additional details of the 2-step forming process are provided in parent application entitled, ELECTRODE FORMING PROCESS FOR METAL-ION BATTERY WITH HEXACYANOMETALLATE ELECTRODE, invented by Yuhao Lu et al., Ser. No. 13/432,993.

The forming process can be summarized as follows. For simplicity, it is assumed that the ions at the A site are all removed in the first step.

In the first step:
$A'_nM_1M_2(CN)_6 \rightarrow nA' + M_1M_2(CN)_6 + ne^-$;
Residual water is removed: $2H_2O = 4H^+ + O_2\uparrow + 4e^-$.
In the second step:
$M_1M_2(CN)_6 + me^- + mNa^+ \rightarrow Na_mM_1M_2(CN)_6$ (m≥1) for the sodium-ion battery; or,
$M_1M_2(CN)_6 + me^- + mK^+ \rightarrow K_mM_1M_2(CN)_6$ (m≥1) for the potassium-ion battery; or,
$M_1M_2(CN)_6 + 2me^- + mMg^{2+} \rightarrow Mg_mM_1M_2(CN)_6$ (m≥0.5) for the magnesium-ion battery; or,
$M_1M_2(CN)_6 + 2me^- + mCa^{2+} \rightarrow Ca_mM1M_2(CN)_6$ (m≥0.5) for the calcium-ion battery.

All steps are operated in a water-free environment. After the forming process, the electrode is ready for battery assembly.

Note that the A' ions in cathode material $A'_nM_1M_2(CN)_6$ before the forming process, and the A ions in $A_mM_1M_2(CN)_6$ after forming process may be a different material. For example, $K_xM_1M_2(CN)_6$ is used before the electrode forming process, and the materials change to $Na_xM_1M_2(CN)_6$ or $Na_xK_yM_1M_2(CN)_6$ after forming process for a Na-ion battery application.

The negative (anode) electrode is fabricated as follows. A dried non-metal negative electrode powder (e.g., carbonaceous material, oxides, or sulfides) is mixed with binder such as PTFE or PVDF, etc., and an electronic conductor powder (carbon black, carbon nanotube, carbon nanowire, grapheme, etc., with particle size of 5 nm-10 μm) in low boiling point solvent to form a paste. The composition of the paste is 60 wt. %-95 wt. % non-metal anode, 0 wt. %-30 wt. % electronic conductor powder, and 1 wt. %-15 wt. % binder. The paste is coated on a metal foil or mesh (Cu, Ti, Ni, etc.) that is used as the current collector for the negative electrode. The negative electrode has a very low potential that can reduce the organic electrolyte to form an ion-permeable layer on the negative electrode so-called solid electrolyte interphase (SEI). The SEI improves the stability of the negative electrode in the ion battery. However, the reduction reaction exhausts the metal-ions ($Na^+$, $K^+$, $Mg^{2+}$, or $Ca^{2+}$) from the positive electrode, which decreases the capacity of the positive electrode. So a process of forming the electrode is applied to the negative electrode prior to the electrode slitting and battery assembly. The forming process is performed in a water-free environment. The negative electrode (anode) is paired with a counter metal-electrode (e.g., Na, K, Mg, Ca) in an electrochemical cell that includes an organic electrolyte with metal-ions ($Na^+$, $K^+$, $Mg^{2+}$, $Ca^{2+}$). Upon receiving the electrical field in the electrochemical cell that moves the metal ions toward the negative electrode, the metal-ions insert into or react with the negative electrode. At the same time, the electrolyte reacts with the negative electrode to form a SEI layer that contains metal ions, carbon, oxygen, and hydrogen on the negative electrode surface. Next, in the same electrochemical cell, an opposite electrical field is applied and the metal-ions are de-inserted from the negative electrode. However, the SEI layer is intact. For example, if a Na-ion battery is being formed, the counter electrode in made with Na, and the electrolyte includes Na ions. After the process, an-ion permeable inner layer forms on the electrode.

Figure 5A:
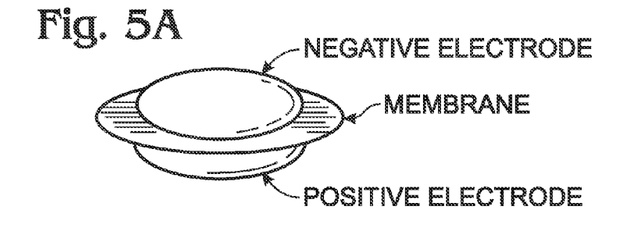
FIGS. 5A through 5C depict three types of battery configurations.
Figure 5B:
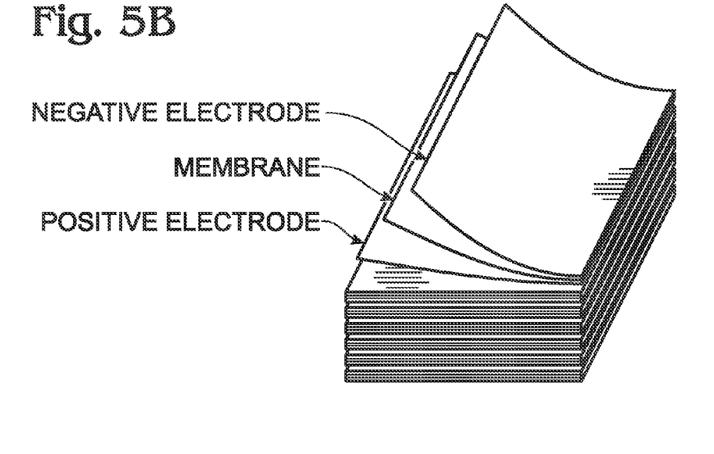
Figure 5C:
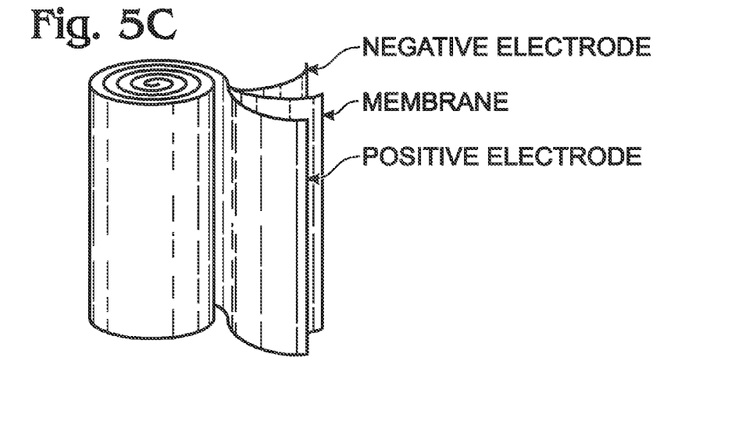

FIGS. 5A through 5C depict three types of battery configurations. After the positive electrode and the negative electrode are prepared, the battery can be assembled. A membrane separates the positive and negative electrode. The membrane can be one of polymer, gel, or solid materials. The sandwich electrode assembly can be configured according to the container shape of the battery. The electrode assembly is put into a container. If a liquid solution is needed to help the ion transport, it can be injected into the container. After all the electrodes are thoroughly soaked in electrolyte, the container is sealed.

An all-solid sodium ion-battery or potassium-ion battery, uses a different composition for the electrode fabrication. The all-solid ion battery consists of the positive electrode and the negative electrode separated by an ion-conduct solid electrolyte. For example, in the sodium-ion battery, $\beta$-$Al_2O_3$, $NaZr_2(PO_4)_3$, $Na_4Zr_2(SiO_4)_3$ and their derivates can be used as the $Na^+$-ion solid electrolyte. In order to improve the ions transport in the electrode, the 5 wt. %-60 wt. % solid electrolyte powder can be added into the pastes of the positive electrode and the negative electrode to prepare the electrode. After obtaining the electrode, they can be assembled into a battery as described above.

Figure 6:
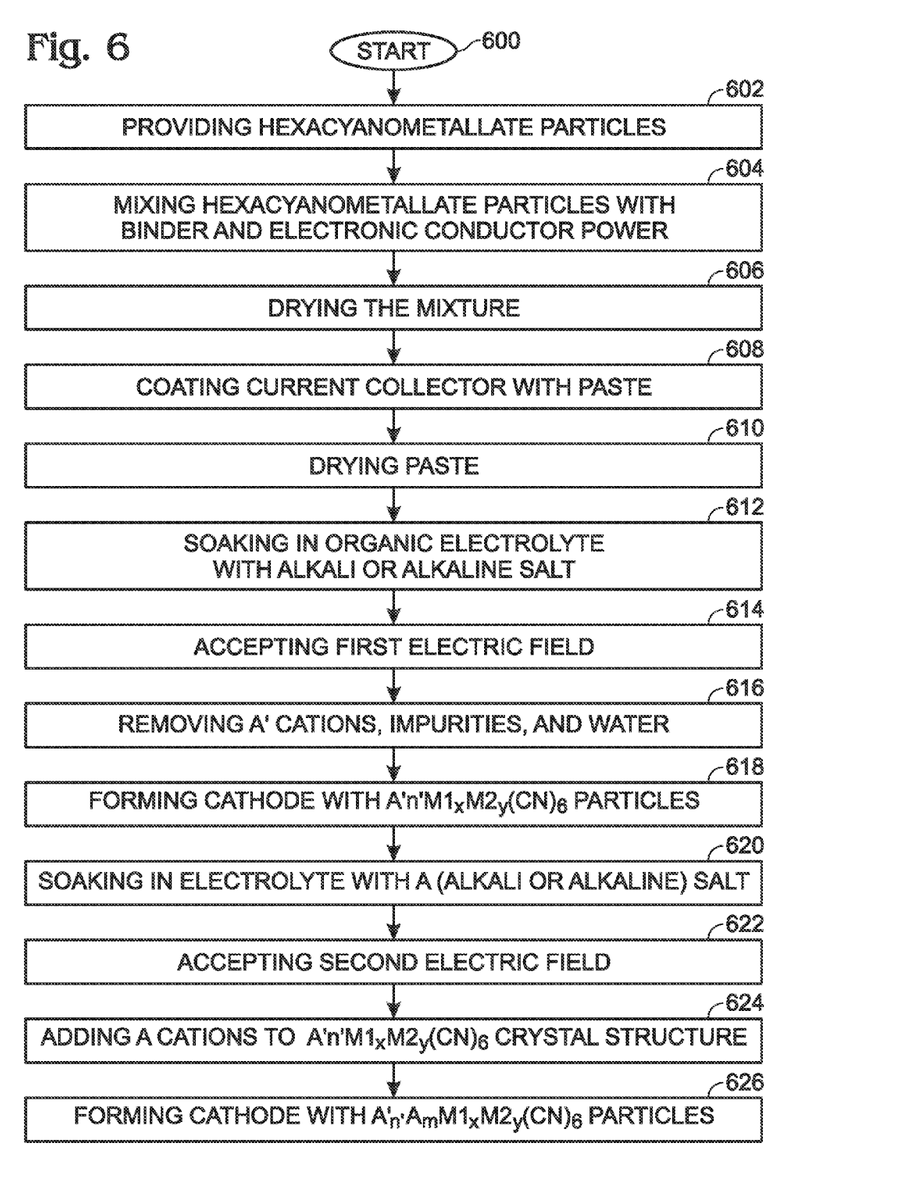
FIG. 6 is a flowchart illustrating a method for forming a hexacyanometallate battery cathode.

FIG. 6 is a flowchart illustrating a method for forming a hexacyanometallate battery cathode. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 600.

Step 602 provides dried hexacyanometallate particles having a chemical formula $A'_nM1_xM2_y(CN)_6$ with a Prussian Blue hexacyanometallate crystal structure, including impurities and $H_2O$. A' is either an alkali or alkaline-earth cations, and M1 is a metal with 2+ or 3+ valance positions. Likewise, M2 is a metal 2+ or 3+ valance positions, n is in the range of 0.5 to 2, x is in the range of 0.5 to 1.5, and y is in the range of 0.5 to 1.5. For example, the A' cations may be $Na^+$, $K^+$, $Mg^{2+}$, or $Ca^{2+}$. The M1 metal may be Ti, V, Cr, Mn, Fe, Co, Ni, Cu, Zn, Ca, or Mg for example. Likewise, the M2 metal may be Ti, V, Cr, Mn, Fe, Co, Ni, Cu, Zn, Ca, or Mg. The M1 may be the same metal as the M2 metal or a different metal than the M2 metal. The dried hexacyanometallate particles typically have a size in the range of 5 nm to 10 microns.

Step 604 mixes the hexacyanometallate particles with a binder and electronic conductor powder in a low boiling point solvent. Some examples of low boiling point solvents include amyl acetate, acetone, diethyl carbonate, dimethyl carbonate, and n-methyl-2-pyrrolidone (NMP). The binder may be PTFE or PVDF, for example. Typically, the electronic conductor powder is carbon black, carbon nanotubes, carbon nanowire, or grapheme, having a particle size in the range of 5 nm to 10 microns.

Step 606 dries the mixture, forming a $A'_nM1_xM2_y(CN)_6$ paste. In one aspect, the paste is 60 to 95 weight (wt) % $A'_nM1_xM2_y(CN)_6$, 0 to 30 wt % electronic conductor powder, and 1 to 15 wt % binder.

Step 608 coats a metal current collector with the paste, forming a cathode. Step 610 dries the paste. Step 612 soaks the cathode in an organic first electrolyte including a salt with either alkali or alkaline-earth cations. Step 614 accepts a first electric field in the first electrolyte between the cathode and a first counter electrode. In response to the first electric field, Step 616 simultaneously removes A' cations, impurities, and water molecules from interstitial spaces in the Prussian Blue hexacyanometallate crystal structure. Step 618 forms hexacyanometallate particles having a chemical formula of $A'_{n'}M1_xM2_y(CN)_6$, where n'<n, overlying the cathode.

In one aspect, subsequent to forming $A'_{n'}M1_xM2_y(CN)_6$ in Step 618, Step 620 soaks the cathode in an organic second electrolyte including a salt with A cations, where A is either an alkali or alkaline-earth cation. Typically, the A cations are $Na^+$, $K^+$, $Mg^{2+}$, or $Ca^{2+}$. The A cations may be the same material as the A' cations or a different material than the A' cations.

Step 622 accepts a second electric field in the second electrolyte between the cathode and a second counter electrode including A elements. In response to the second electric field, Step 624 adds A cations into the interstitial spaces of the $A'_{n'}M1_xM2_y(CN)_6$ crystal structure. Step 626 forms a cathode with hexacyanometallate particles having the chemical formula $A'_{n'}A_mM1xM2y(CN)_6$, where m is in a range of 0.5 to 2. In one aspect, Step 626 forms hexacyanometallate particles with the chemical formula of $A_mM1_xM2_y(CN)_6$, where n'=0.

Figure 7:
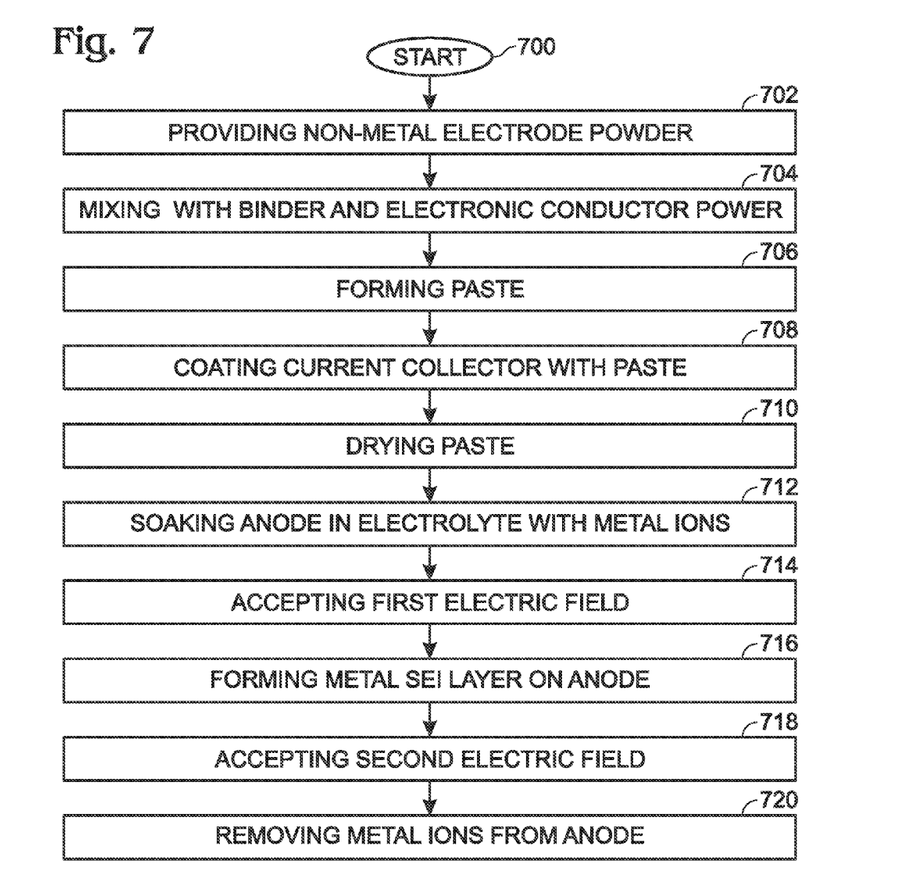
FIG. 7 is a flowchart illustrating a method for forming a non-metal battery anode.

FIG. 7 is a flowchart illustrating a method for forming a non-metal battery anode. The method begins at Step 700. Step 702 provides a dried non-metal electrode powder. Step 704 mixes the dried non-metal electrode powder with a binder and an electronic conductor powder in a low boiling point solvent. Step 706 forms a paste. Step 708 coats a metal current collector with the paste, forming an anode. In Step 710 the paste dries. Step 712 soaks the anode in a first organic electrolyte including a salt with metal ions. Step 714 accepts a first electric field in the electrolyte between the anode and a metal first counter electrode. In response to the first electric field, Step 716 forms a metal solid electrolyte interphase (SEI) layer overlying the anode. In one aspect, the metal SEI layer additionally includes carbon, oxygen, hydrogen, and combinations of the above-mentioned elements.

Subsequent to forming the SEI layer, Step 718 accepts a second electric field, opposite in polarity to the first electric field between the anode and the first counter electrode. Step 720 removes metal ions from the anode while maintaining the SEI layers intact.

In one aspect, soaking the anode in the first organic electrolyte in Step 712 includes soaking in a first organic electrolyte with A cations such as Na, K, Mg, or Ca. Likewise, Step 714 uses a metal first counter electrode that additional includes the A cations used in Step 712. Then, Step 716 forms the anode from a composite that includes the A cations used in Steps 712 and 714.

A battery with a hexacyanometallate cathode and non-metal anode has been provided with an associated cathode fabrication process. Examples of particular materials and process steps have been presented to illustrate the invention. However, the invention is not limited to merely these examples. Other variations and embodiments of the invention will occur to those skilled in the art.

We claim:

1. A method for forming a non-metal battery anode, the method comprising:
    providing a dried non-metal electrode powder;
    mixing the dried non-metal electrode powder with a binder and an electronic conductor powder in a low boiling point solvent selected from a group consisting of amyl acetate, acetone, diethyl carbonate, dimethyl carbonate, and n-methyl-2-pyrrolidone (NMP);
    forming a paste;
    coating a metal current collector with the paste, forming an anode;
    drying the paste;
    soaking the anode in a first organic electrolyte including a salt with metal ions;
    accepting a first electric field in the electrolyte between the anode and a metal first counter electrode;
    in response to the first electric field, forming a metal ion-containing solid electrolyte interphase (SEI) layer overlying the anode;
    subsequent to forming the metal ion-containing SEI layer, accepting a second electric field, opposite in polarity to the first electric field between the anode and the first counter electrode; and,
    removing metal ions from the anode while maintaining the metal ion-containing SEI layer intact.

2. The method of claim 1 wherein soaking the anode in the first organic electrolyte includes the metal ions being selected from a group consisting of Na, K, Mg, and Ca; and,
    wherein accepting the first electric field includes accepting the electrolyte between the anode and a first counter electrode with the selected metal ions.

3. The method of claim 1 wherein forming the metal ion-containing SEI layer overlying the anode includes forming the metal ion-containing SEI layer with additional elements selected from a group consisting of carbon, oxygen, hydrogen, and combinations of the above-mentioned elements.

4. The method of claim 1 wherein soaking the anode in the first organic electrolyte includes soaking in a first organic electrolyte with A cations selected from a group consisting of Na, Ka, Mg, and Ca;
    wherein accepting the first electric field includes accepting the first electric field between the anode and a metal first counter electrode additional with the selected A cations; and,
    wherein forming the metal ion-containing SEI layer includes additionally forming the anode from a composite with the selected A cations.

5. A method for forming a non-metal battery anode, the method comprising:
    providing a non-metal anode soaked in an organic electrolyte including a salt with metal ions;
    accepting a first electric field in the electrolyte between the anode and a metal first counter electrode;
    in response to the first electric field, forming a metal ion-containing solid electrolyte interphase (SEI) layer overlying the anode;
    subsequent to forming the metal ion-containing SEI layer, accepting a second electric field, opposite in polarity to the first electric field between the anode and the first counter electrode; and,
    removing metal ions from the anode while maintaining the metal ion-containing SEI layer intact.

6. The method of claim 5 wherein soaking the anode in the first organic electrolyte includes the metal ions being selected from a group consisting of Na, K, Mg, and Ca; and,
    wherein accepting the first electric field includes accepting the electrolyte between the anode and a first counter electrode with the selected metal ions.

7. The method of claim 5 wherein forming the metal ion-containing SEI layer overlying the anode includes forming the metal ion-containing SEI layer with additional elements selected from a group consisting of carbon, oxygen, hydrogen, and combinations of the above-mentioned elements.

8. The method of claim 5 wherein soaking the anode in the first organic electrolyte includes soaking in a first organic electrolyte with A cations selected from a group consisting of Na, Ka, Mg, and Ca;
    wherein accepting the first electric field includes accepting the first electric field between the anode and a metal first counter electrode additional with the selected A cations; and,
    wherein forming the metal ion-containing SEI layer includes additionally forming the anode from a composite with the selected A cations.

* * * * *